United States Patent
Smith

(10) Patent No.: US 11,197,402 B2
(45) Date of Patent: Dec. 14, 2021

(54) SYSTEM AND METHOD FOR DETECTING PLUGGING OF AN AGRICULTURAL IMPLEMENT BASED ON DISC SCRAPER ACCELERATION

(71) Applicant: CNH Industrial America LLC, New Holland, PA (US)

(72) Inventor: Kevin M. Smith, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 242 days.

(21) Appl. No.: 16/394,481

(22) Filed: Apr. 25, 2019

(65) Prior Publication Data

US 2020/0337200 A1    Oct. 29, 2020

(51) Int. Cl.
| | | |
|---|---|---|
| A01B 15/16 | (2006.01) | |
| A01C 5/06 | (2006.01) | |
| A01B 76/00 | (2006.01) | |
| A01B 71/08 | (2006.01) | |
| G01P 15/00 | (2006.01) | |
| A01B 23/06 | (2006.01) | |

(52) U.S. Cl.
CPC ............. *A01B 15/16* (2013.01); *A01B 23/06* (2013.01); *A01B 71/08* (2013.01); *A01B 76/00* (2013.01); *A01C 5/064* (2013.01); *G01P 15/003* (2013.01)

(58) Field of Classification Search
CPC ......... A01B 15/16; A01B 71/08; A01B 76/00; A01B 15/00; A01B 71/00; A01B 23/06; A01B 23/00; A01C 5/064; A01C 5/062; A01C 5/06; A01C 5/00; G01P 15/003; G01P 15/00
See application file for complete search history.

(56) References Cited

U.S. PATENT DOCUMENTS

| | | |
|---|---|---|
| 6,223,832 B1 | 5/2001 | Hook et al. |
| 6,871,416 B2 | 3/2005 | Leja et al. |
| 8,408,149 B2 | 4/2013 | Rylander |
| 9,144,189 B2 | 9/2015 | Stoller et al. |
| 9,664,249 B2 | 5/2017 | Kowalchuk |
| 9,883,626 B2 | 2/2018 | Heim et al. |
| 2017/0094889 A1 | 4/2017 | Garner et al. |
| 2018/0092290 A1 | 4/2018 | Hubner et al. |
| 2018/0184581 A1 | 7/2018 | Morgan et al. |
| 2018/0340845 A1 | 11/2018 | Rhodes et al. |

FOREIGN PATENT DOCUMENTS

WO    WO 2018/020310    2/2018

*Primary Examiner* — Christopher J. Novosad
(74) *Attorney, Agent, or Firm* — Rebecca L. Henkel; Rickard K. DeMille

(57) ABSTRACT

In one aspect, a system for detecting plugging of an agricultural implement may include a disc rotatably coupled to a frame member, with the disc configured to rotate relative to soil within a field as the implement is moved across the field. The system may also include a disc scraper coupled to the frame member, with the disc scraper configured to remove the soil from the disc as the disc rotates relative to the soil. Furthermore, the system may include a sensor configured to detect a parameter indicative of an acceleration of the disc scraper relative to frame member. Additionally, a controller of the system may be configured to monitor the acceleration of the disc scraper relative to the frame member based on data received from the sensor moreover. The controller may be further configured to determine when the disc is plugged based on the monitored acceleration.

19 Claims, 5 Drawing Sheets

SYSTEM AND METHOD FOR DETECTING PLUGGING OF AN AGRICULTURAL IMPLEMENT BASED ON DISC SCRAPER ACCELERATION

FIELD OF THE INVENTION

The present disclosure generally relates to systems and method for detecting plugging of an agricultural implement and, more particularly, to systems and methods for detecting plugging of one or more discs of an agricultural implement based on the acceleration of an associated disc scraper.

BACKGROUND OF THE INVENTION

Modern farming practices strive to increase yields of agricultural fields. In this respect, seed-planting implements are towed behind a tractor or other work vehicle to disperse seed throughout a field. For example, as a seed-planting implement is moved across the field, one or more furrow-forming tools or disc openers of the implement may form a furrow or trench in the soil. One or more dispensing devices may, in turn, deposit the seeds into the furrow(s). After deposition of the seeds, a furrow-closing assembly may close the furrow in the soil, and a packer wheel may pack the soil on top of the deposited seeds.

As the implement is moved across the field, soil may accumulate on the disc opener(s). In this regard, the implement may include a disc scraper associated with each opener. In general, each disc scraper is configured to clean or otherwise remove any soil that accumulates the corresponding disc opener. However, in certain instances (e.g., when the soil is wet and/or heavy), the amount of soil accumulating on the disc opener(s) may be too great for the associated disc scraper(s) to remove. In such instances, the disc opener(s) may become plugged with soil, thereby causing the rotation of such opener(s) to slow or halt. Plugged disc opener(s) may, in turn, result in poor furrow quality and incorrect seed depth.

Accordingly, an improved system and method for detecting plugging of an agricultural implement based on disc scraper acceleration would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for detecting plugging of an agricultural implement. The system may include a frame member and a disc rotatably coupled to the frame member, with the disc configured to rotate relative to soil within a field as the agricultural implement is moved across the field. The system may also include a disc scraper coupled to the frame member, with the disc scraper configured to remove the soil from the disc as the disc rotates relative to the soil. Furthermore, the system may include a sensor configured to detect a parameter indicative of an acceleration of the disc scraper relative to frame member. Additionally, the system may include a controller communicatively coupled to the sensor. The controller may be configured to monitor the acceleration of the disc scraper relative to the frame member based on data received from the sensor. Moreover, the controller may be further configured to determine when the disc is plugged based on the monitored acceleration.

In another aspect, the present subject matter is directed to a method for detecting plugging of an agricultural implement. The agricultural implement may include a disc configured to rotate relative to soil within a field as the agricultural implement is moved across the field. The agricultural implement may further include a disc scraper configured to remove the soil from the disc as the disc rotates relative to the soil. The method may include monitoring, with a computing device, an acceleration of the disc scraper relative to a frame member of the agricultural implement. Furthermore, the method may include determining, with the computing device, when the disc is plugged based on the monitored acceleration. Additionally, the method may include initiating, with the computing device, a control action associated with de-plugging the disc when it is determined that the disc is plugged.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

DETAILED DESCRIPTION OF THE DRAWINGS

Figure 1:
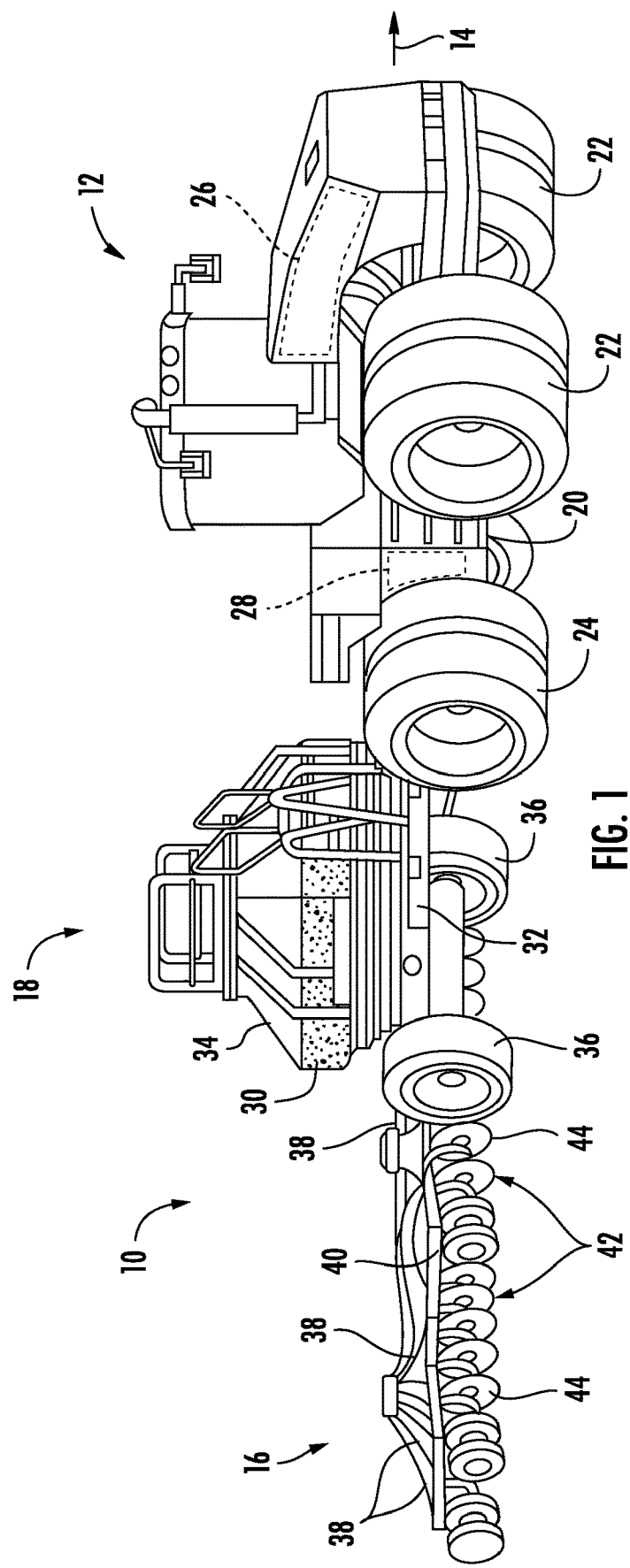
FIG. 1 illustrates a perspective view of one embodiment of an agricultural implement coupled to a work vehicle in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for detecting plugging of an agricultural implement. Specifically, in several embodiments, the system may include a sensor configured to capture data indicative of the acceleration of a disc scraper of the agricultural implement relative to a frame member of the implement. The disc scraper may, in turn, be configured to remove soil accumulating on a disc rotatably coupled to the frame member, with the disc configured to rotate relative to soil within a field as the implement is moved across the field. During normal operation of the agricultural implement (e.g., when the disc is not plugged with soil), the disc scraper may vibrate relative to the frame member such that the scraper experiences accelerations within a predetermined range. However, in certain instances (e.g., when the soil is wet and/or heavy), the amount of soil accumulating on the disc may be too great for the disc scraper to remove such that the disc becomes plugged with soil, thereby causing the rotation of the disc to slow and/or halt. In such instances, the acceleration of the disc scraper relative to the frame member may similarly slow and/or halt. In this respect, as the agricultural implement is moved across the field, a controller of the disclosed system may be configured to monitor the acceleration of the disc scraper relative to the frame member based on data received from the sensor.

In accordance with aspects of the present subject matter, the controller may be configured to determine when the disc is plugged based on the monitored acceleration of the disc scraper. As indicated above, the monitored acceleration of the disc scraper may slow and/or halt when the disc becomes plugged. As such, in one embodiment, the controller may be configured to determine that the disc is plugged with soil when the monitored acceleration of the disc scraper falls below a predetermined minimum acceleration value and/or reaches zero. Thereafter, when it is determined that the disc is plugged, the controller may be configured to initiate one or more control actions associated with de-plugging the disc. For instance, the control action(s) may include adjusting one or more operating parameters of the agricultural implement, such as the ground speed of the implement, the down pressure applied to disc, and/or the penetration depth of the disc.

Referring now to the drawings, FIG. 1 illustrates a perspective view of an agricultural implement 10 coupled to a work vehicle 12. In general, the vehicle 12 may be configured to tow the implement 10 across a field in a direction of travel (e.g., as indicated by arrow 14 in FIG. 1). As shown, in the illustrated embodiment, the implement 10 is configured as a seeder 16 (e.g., a seed disc drill) and an associated air cart 18, and the vehicle 12 is configured as an agricultural tractor. However, in alternative embodiments, the implement 10 may be configured as any other suitable type of implement, such as a planter or another seed-dispensing implement, a side dresser or another fertilizer-dispensing implement, a strip tiller, a tillage implement (e.g., a disc harrow), and/or the like. Similarly, the vehicle 12 may be configured as any other suitable type of vehicle, such as an agricultural harvester, a self-propelled sprayer, and/or the like.

As shown, the vehicle 12 may include a frame or chassis 20 configured to support or couple to a plurality of components. For example, a pair of steerable front wheels 22 and a pair of driven rear wheels 24 (one is shown) may be coupled to the frame 20. The wheels 22, 24 may be configured to support the vehicle 12 relative to the ground and move the vehicle 12 in the direction of travel 14 across the field. However, in alternative embodiments, the front wheels 22 may be driven in addition to or in lieu of the rear wheels 24. Moreover, in further embodiments, the vehicle 12 may include track assemblies (not shown) in place of the front and/or rear wheels 22, 24.

Furthermore, the vehicle 12 may include one or more devices for adjusting the speed at which the vehicle 12 moves across the field in the direction of travel 14. Specifically, in several embodiments, the work vehicle 12 may include an engine 26 and a transmission 28 mounted on the frame 20. In general, the engine 26 may be configured to generate power by combusting or otherwise burning a mixture of air and fuel. The transmission 28 may, in turn, be operably coupled to the engine 26 and may provide variably adjusted gear ratios for transferring the power generated by the engine 26 to the driven wheels 24. For example, increasing the power output by the engine 26 (e.g., by increasing the fuel flow to the engine 26) and/or shifting the transmission 28 into a higher gear may increase the speed at which the vehicle 12 moves across the field. Conversely, decreasing the power output by the engine 26 (e.g., by decreasing the fuel flow to the engine 26) and/or shifting the transmission 28 into a lower gear may decrease the speed at which the vehicle 12 moves across the field.

Referring still to FIG. 1, the air cart 18 may be configured to be towed directly behind the work vehicle 12, with the seeder 16 being towed behind the air cart 18. In this regard, a first hitch assembly (not shown) may couple the air cart 18 to the work vehicle 12, and a second hitch assembly (not shown) may couple the seeder 16 to the air cart 18. However, in an alternative embodiment, the seeder 16 may be towed directly behind the work vehicle 12, with the air cart 18 towed behind the seeder 16. In a further embodiment, the air cart 18 and the seeder 16 may be part of a single unit that is towed behind the work vehicle 12, or elements of a self-propelled vehicle configured to distribute agricultural product across a field.

In several embodiments, the air cart 18 may be configured to store a flowable granular or particulate-type agricultural product 30, such as seeds, fertilizer, and/or the like, to be deposited within the soil. Specifically, in one embodiment, the air cart 18 may include a frame 32 configured to support or couple to various components of the air cart 18. For example, as shown, the frame 32 may be configured to support a hopper or storage tank 34 configured for storing the agricultural product 30 to be deposited within the furrow. Furthermore, a plurality of wheels 36 may be coupled to the frame 32 to permit the air cart 18 to be towed across a field by the work vehicle 12. Additionally, a plurality of delivery conduits 38 may be configured to convey the agricultural product 30 from the air cart 18 to the seeder 16 for deposition into the furrow.

Moreover, in several embodiments, the seeder 16 may include a toolbar 40 configured to support or couple to various components of the seeder 16, such as one or more row units 42. As will be described below, each row unit 42 may include one or more disc openers 44, with each disc opener 44 configured to excavate a furrow or trench in soil to facilitate deposition of the flowable granular or particulate-type agricultural product 30. It should be appreciated that the seeder 16 may generally include any number of row units 42 to facilitate delivery of the agricultural product 30 across a given swath of the soil. For instance, in one embodiment, the seeder 16 may include twenty-four row units 42 spaced apart across the width of the seeder 16. In alternative embodiments, however, the seeder 16 may include any other suitable number of row units 42, such as less than twenty-four row units 42 or more than twenty-four row units 42.

Figure 2:
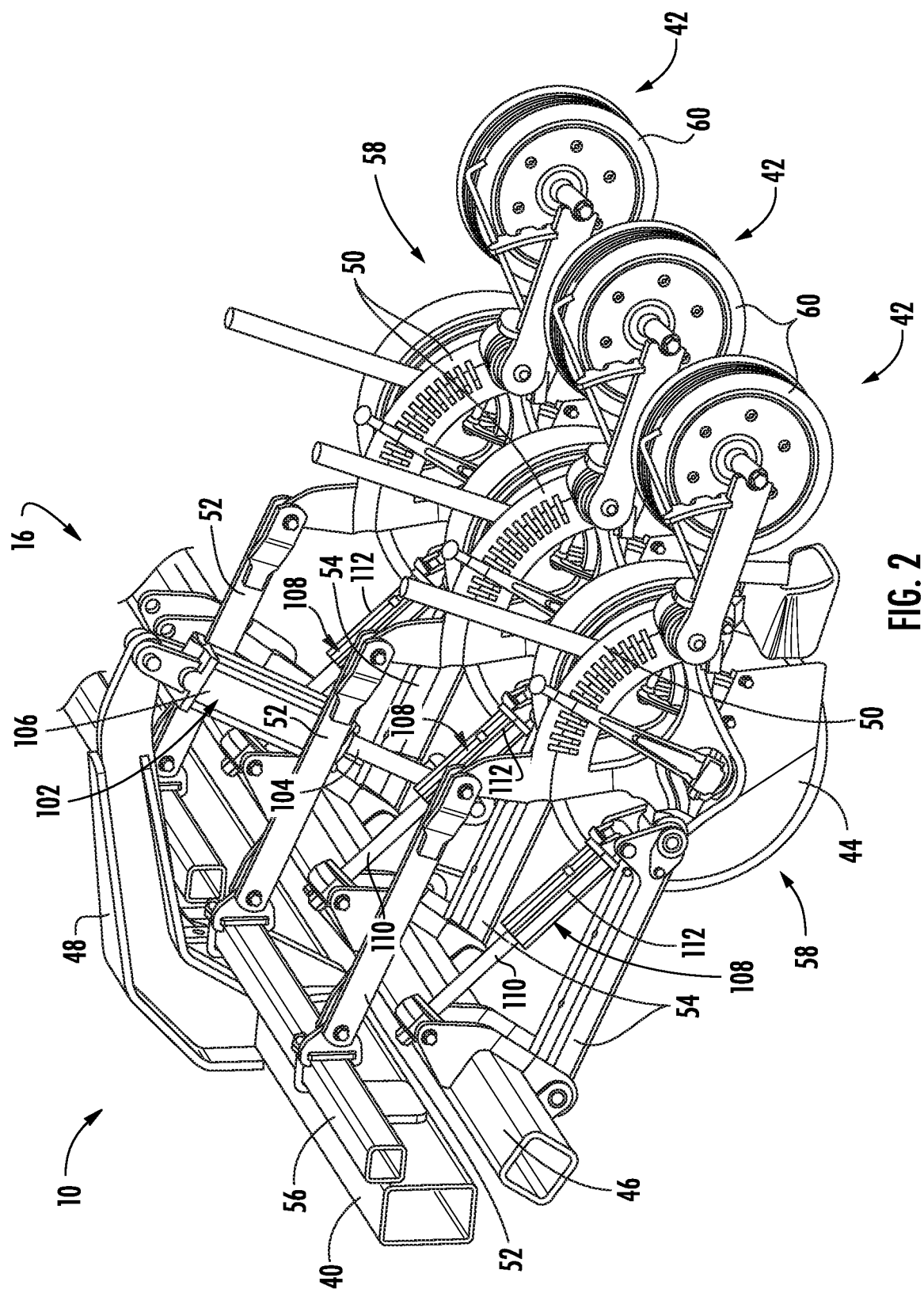
FIG. 2 illustrates an enlarged, partial perspective view of the agricultural implement shown in FIG. 1, particularly illustrating various components of the implement.

Referring now to FIG. 2, an enlarged, partial perspective view of the seeder 16 of the implement 10 shown in FIG. 1 is illustrated. As shown, the seeder 16 may include a rockshaft 46 that is moveable relative to the toolbar 40. In this regard, the seeder 16 may include a rockshaft actuator 102 configured to rotate or otherwise move the rockshaft 46 relative to the toolbar 40. For example, in one embodiment, a first end of the actuator 102 (e.g., a rod 104 of the actuator 102) may be coupled to the rockshaft 46, while a second end of the actuator 102 (e.g., a cylinder 106 of the actuator 102) may be coupled to a support arm 48 of the seeder 16, which is, in turn, coupled to the toolbar 40. As such, the rod 104 of the actuator 102 may be configured to extend and/or retract relative to the cylinder 106 of the actuator 102 to rotate the rockshaft 46 relative to the toolbar 40. Such rotation may, in turn, adjust a down pressure applied to and/or the penetration depth of the disc opener(s) 44 of the various row units 42 ganged together via the rockshaft 46. In the illustrated embodiment, the actuator 102 corresponds to a fluid-driven actuator, such as a hydraulic or pneumatic cylinder. However, in alternative embodiments, the actuator 102 may correspond to any other suitable type of actuator, such as an electric linear actuator.

As indicated above, in several embodiments, a plurality of the row units 42 of the seeder 16 may be ganged together via the toolbar 40 and the rockshaft 46. Each row unit 42 may, in turn, include a frame member or backbone 50 adjustably coupled to the toolbar 40 and the rockshaft 46 by upper and lower links 52, 54. For example, in one embodiment, one end of each upper link 52 may be pivotably coupled to the backbone 50 of the corresponding row unit 42, while an opposed end of each upper link 52 may be pivotably coupled to a rail 56 of the seeder 16, which is, in turn, coupled to the toolbar 40. Similarly, one end of each lower link 54 may be pivotably coupled to the backbone 50 of the corresponding row unit 42, while an opposed end of each lower link 54 may be pivotably coupled to the rockshaft 46. As such, each pair of links 52, 54 may allow the corresponding row unit 42 to pivot relative to the toolbar 40 and the rockshaft 46. However, in alternative embodiments, each row unit 42 may be coupled to the toolbar 40 and/or the rockshaft 46 in any other suitable manner.

Additionally, the seeder 16 may include a plurality of row unit actuators 108. Each actuator 108 may, in turn, be configured to move or otherwise adjust the position of the one of the row units 42 relative to the rockshaft 46. For example, as shown, in one embodiment, a first end of each actuator 108 (e.g., a rod 110 of the actuator 108) may be coupled to the rockshaft 46, while a second end of the actuator 108 (e.g., a cylinder 112 of the actuator 108) may be coupled to the backbone 50 of the corresponding row unit 42. As such, the rod 110 of each actuator 108 may be configured to extend and/or retract relative to the cylinder 112 of corresponding actuator 108 to move the corresponding row unit 42 relative to the rockshaft 46. Such movement may, in turn, adjusts the down pressure applied to and/or the penetration depth of the disc opener(s) 44 of the corresponding row unit 42. In the illustrated embodiment, the actuators 108 corresponds to a fluid-driven actuator, such as a hydraulic or pneumatic cylinder. However, in alternative embodiments, the actuators 108 may correspond to any other suitable type of actuator, such as an electric linear actuator.

Moreover, as shown in FIG. 2, each row unit 42 may also include a furrow-opening assembly 58, a furrow-closing assembly (not shown), and a press wheel 60. In general, each furrow-opening assembly 58 may include one or more disc openers 44 configured to excavate a furrow or trench in the soil for the deposition of seeds or other agricultural substances therein (e.g., fertilizer). The furrow-closing assemblies are not shown to better illustrate the disc openers 44. As is generally understood, each furrow-closing assembly may include a closing disc(s) configured to close the furrow after seeds have been deposited into the furrow. Each press wheel 60 may, in turn, be configured to roll over the corresponding closed furrow to firm the soil over the seeds and promote favorable seed-to-soil contact.

Figure 3:
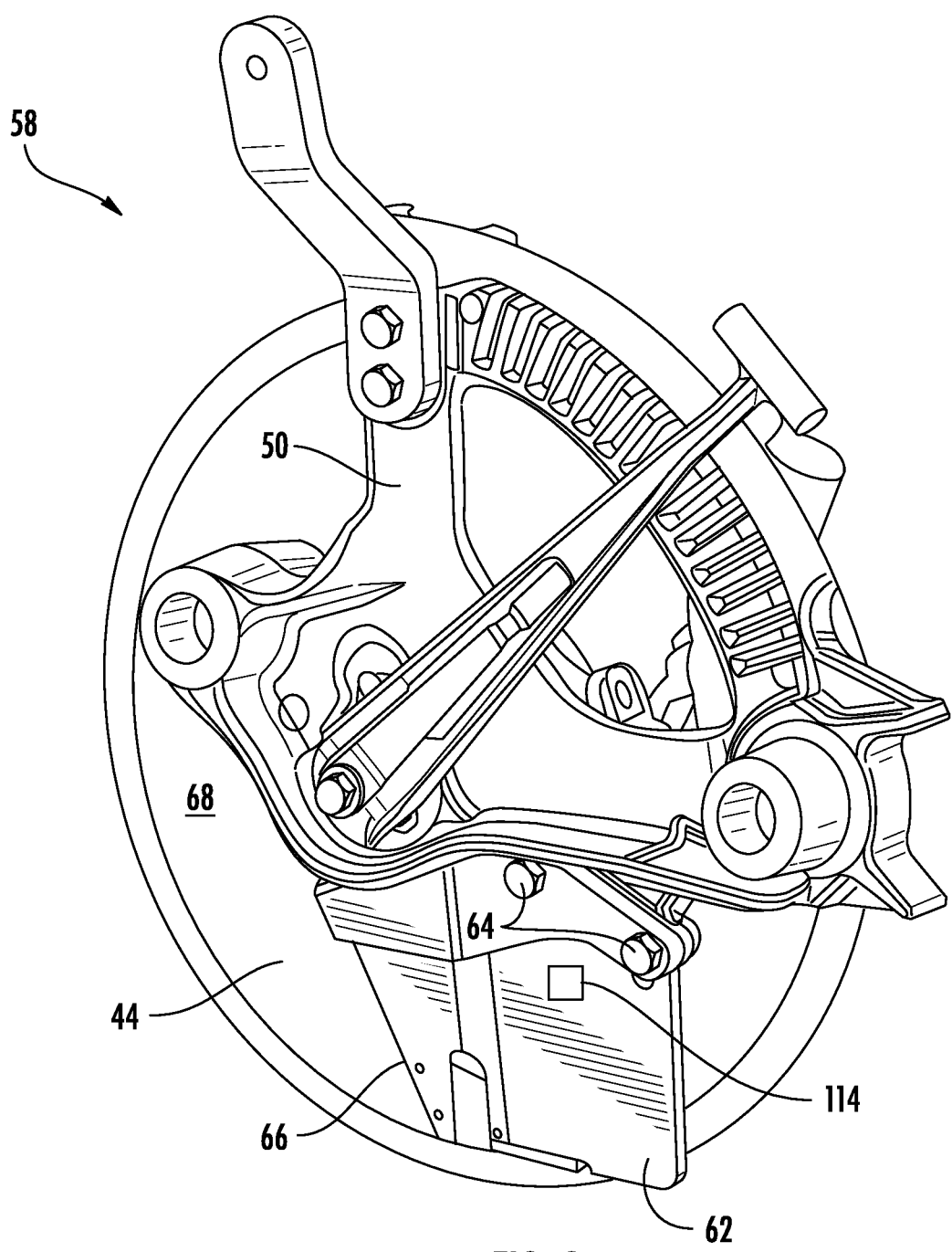
FIG. 3 illustrates a perspective view of one embodiment of a furrow-opening assembly of an agricultural implement in accordance with aspects of the present subject matter, particularly illustrating a disc scraper of the furrow-opening assembly.

Referring now to FIG. 3, a perspective view of one embodiment of a furrow-opening assembly 58 is illustrated in accordance with aspects of the present subject matter. As indicated above, the furrow-opening assembly 58 may include a disc opener 44 configured to excavate a furrow or trench in the soil for the deposition of seeds or other agricultural substances therein. Specifically, in several embodiments, the disc opener 44 may be rotatably coupled to the backbone 50 of the row unit 42. In this regard, as the seeder 16 is moved across the field in the direction of travel 14, the disc opener 44 may be configured to rotate relative to the backbone 50 and the soil within the field such that a furrow is formed. Although the embodiment of the furrow-opening assembly 58 shown in FIG. 3 includes only one disc opener 44, it should be appreciated that the furrow-opening assembly 58 may include any other suitable number of disc openers 44, such as two or more disc openers 44.

In several embodiments, the furrow-opening assembly 58 may include a disc scraper 62 provided in association with the disc opener 44. During a seed-planting operation, soil may adhere to or otherwise accumulate on the disc opener 44 as the opener 44 rotates relative to the soil, particularly when the soil is wet. As such, the disc scraper 62 may be configured to clean or otherwise remove soil that has accumulated on the disc opener 44. For example, as shown, in one embodiment, the disc scraper 62 may be configured as a plate-like member that is coupled to the backbone 50 (e.g., via mechanical fasteners 64). Furthermore, in such an embodiment, the disc scraper 62 may be oriented relative to the disc opener 44 such that a leading edge 66 of the scraper 62 is adjacent to a radially-extending surface 68 of the disc opener 44. In this regard, as the disc opener 44 rotates relative to the backbone 50, the leading edge 66 of the disc scraper 62 contacts the soil that has accumulated on the radially-extending surface 68 of the opener 44, thereby removing the accumulated soil from the opener 44. However, in alternative embodiments, the disc scraper 62 may have any other suitable configuration that permits the scraper 62 to clean or otherwise remove soil that has accumulated on the associated disc opener 44. Additionally, it should be appreciated that the furrow-opening assembly 58 may include additional disc scrapers 62 when the assembly 58 includes more than one disc opener 44. For example, in one embodiment, a disc scraper 62 may be provided in association with each of the disc openers 44.

It should be further appreciated that the configuration of the agricultural implement 10 and the work vehicle 12 described above and shown in FIGS. 1-3 is provided only to place the present subject matter in an exemplary field of use. Thus, it should be appreciated that the present subject matter may be readily adaptable to any manner of implement and/or vehicle configuration.

In accordance with aspects of the present subject matter, the implement 10 may include one or more sensors 114, with each sensor 114 may be provided in operative association with the disc scraper 62. Specifically, in several embodiments, each sensor 114 may be configured to detect a parameter indicative of the acceleration of the associated disc scraper 62 relative to the corresponding frame member (e.g., the backbone 50). As will be described below, the acceleration of each disc scraper 62 may, in turn, be indicative of whether the associated disc (e.g., the associated disc opener 44) has become plugged with soil. For example, as shown, in one embodiment, the acceleration sensor 114 may be directly installed or mounted on the disc scraper 62. However, in alternative embodiments, the acceleration sensor 114 may be installed at any other suitable location on the implement 10. Furthermore, it should be appreciated that the acceleration sensor 114 may be configured as any suitable type of sensing device(s) configured to detect the acceleration or vibrations of the disc scraper 62 relative to the associated frame member (e.g., the backbone 50), such as a piezoelectric accelerometer, an optical accelerometer, a strain gauge, and/or the like.

Figure 4:
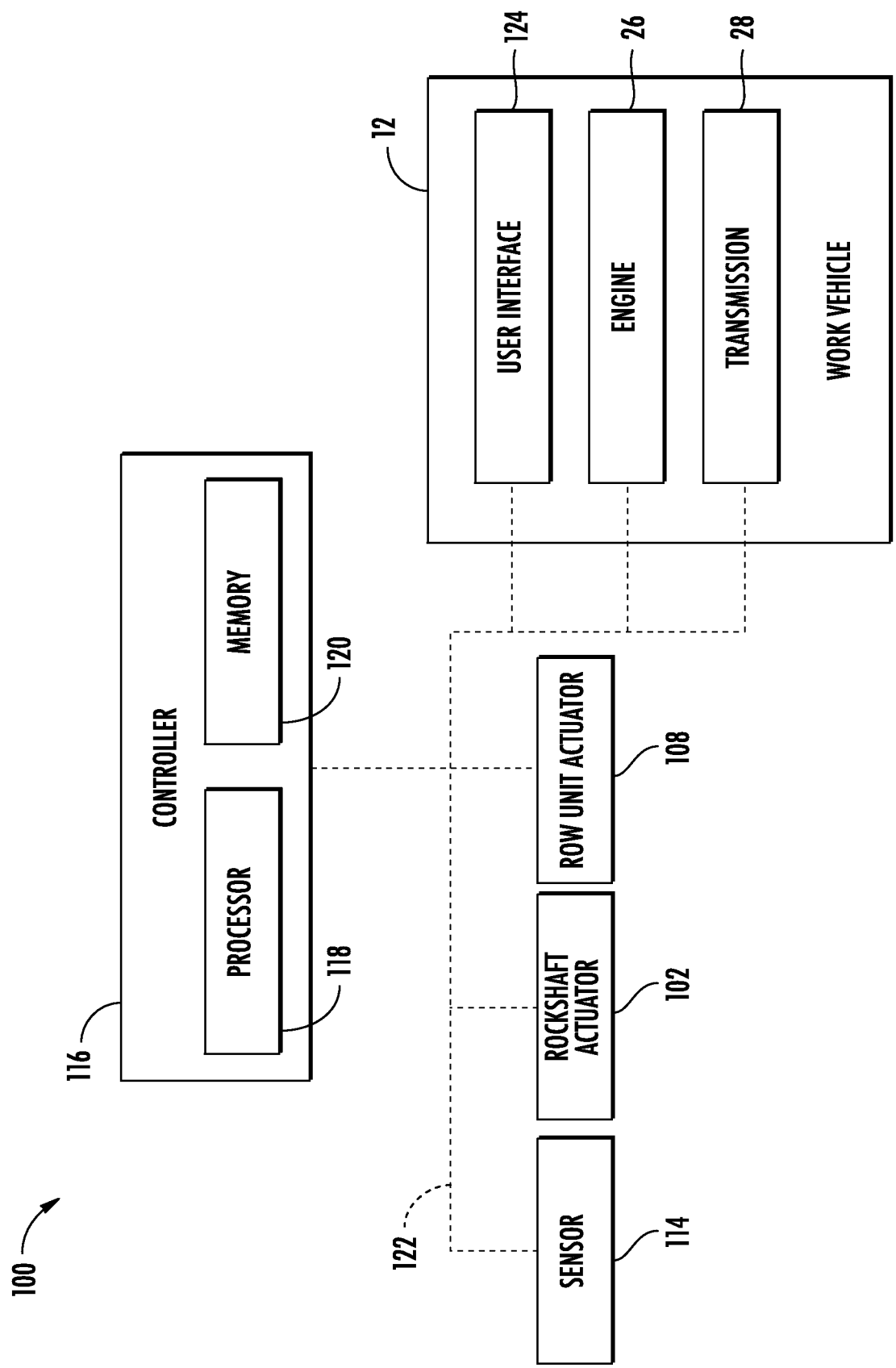
FIG. 4 illustrates a schematic view of one embodiment of a system for detecting plugging of an agricultural implement in accordance with aspects of the present subject matter.

Referring now to FIG. 4, a schematic view of one embodiment of a system 100 for detecting plugging of an agricultural implement is illustrated in accordance with aspects of the present subject matter. In general, the system 100 will be described herein with reference to the agricultural implement 10 and the work vehicle 12 described above with reference to FIGS. 1-3. However, it should be appreciated by those of ordinary skill in the art that the disclosed system 100 may generally be utilized with agricultural implements having any other suitable implement configuration and/or work vehicles having any other suitable vehicle configuration.

As shown in FIG. 4, the system 100 may include a controller 116 positioned on and/or within or otherwise associated with the agricultural implement 10 or the work vehicle 12. In general, the controller 116 may comprise any suitable processor-based device known in the art, such as a computing device or any suitable combination of computing devices. Thus, in several embodiments, the controller 116 may include one or more processor(s) 118 and associated memory device(s) 120 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 120 of the controller 116 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 120 may generally be configured to store suitable computer-readable instructions that, when implemented by the processor(s) 118 configure the controller 116 to perform various computer-implemented functions.

In addition, the controller 116 may also include various other suitable components, such as a communications circuit or module, a network interface, one or more input/output channels, a data/control bus and/or the like, to allow controller 116 to be communicatively coupled to any of the various other system components described herein (e.g., the actuators 102, 108 and the sensor(s) 114). For instance, as shown in FIG. 4, a communicative link or interface 122 (e.g., a data bus) may be provided between the controller 116 and the components 102, 108, 114 to allow the controller 116 to communicate with such components 102, 108, 114 via any suitable communications protocol (e.g., CANBUS).

It should be appreciated that the controller 116 may correspond to an existing controller(s) of the agricultural implement 10 and/or the work vehicle 10, itself, or the controller 116 may correspond to a separate processing device. For instance, in one embodiment, the controller 116 may form all or part of a separate plug-in module that may be installed in association with the implement 10 and/or the vehicle 12 to allow for the disclosed systems to be implemented without requiring additional software to be uploaded onto existing control devices of the implement 10 and/or the vehicle 12. It should also be appreciated that the functions of the controller 116 may be performed by a single processor-based device or may be distributed across any number of processor-based devices, in which instance such devices may be considered to form part of the controller 116. For instance, the functions of the controller 116 may be distributed across multiple application-specific controllers, such as an engine controller, an implement controller, and/or the like.

Furthermore, in one embodiment, the system 100 may also include a user interface 124. More specifically, the user interface 124 may be configured to provide feedback (e.g., feedback or input associated with the acceleration of the disc scraper(s) 62) to the operator of the implement/vehicle 10/12. As such, the user interface 124 may include one or more feedback devices (not shown), such as display screens, speakers, warning lights, and/or the like, which are configured to provide feedback from the controller 116 to the operator. The user interface 124 may, in turn, be communicatively coupled to the controller 116 via the communicative link 122 to permit the feedback to be transmitted from the controller 116 to the user interface 124. In addition, some embodiments of the user interface 124 may include one or more input devices (not shown), such as touchscreens, keypads, touchpads, knobs, buttons, sliders, switches, mice, microphones, and/or the like, which are configured to receive user inputs from the operator. In one embodiment, the user interface 124 may be mounted or otherwise positioned within a cab of the vehicle 12. However, in alternative embodiments, the user interface 124 may mounted at any other suitable location.

In several embodiments, the controller 116 may be configured to monitor the accelerations of one or more disc scrapers of the implement 10. As described above, the implement 10 may include one or more disc scrapers 62, with each scraper 62 configured to clean or otherwise remove accumulated soil from an associated disc (e.g., the associated disc opener 44). Moreover, the implement 10 may include one or more sensors 114, with each sensor 114 configured to capture data indicative of the acceleration of one of the disc scrapers 62 relative to the corresponding frame member (e.g., the corresponding backbone 50). The acceleration of each disc scraper 62 may, in turn, be indicative of whether the corresponding disc is plugged with soil. In this regard, as the implement 10 is moved across the field, the controller 116 may receive the sensor data from the sensor(s) 114 (e.g., via the communicative link 122). Thereafter, the controller 116 may be configured to process/analyze the received sensor data to determine or estimate the acceleration values of the disc scraper(s) 62 relative to the corresponding frame member. For instance, the controller 116 may include a look-up table(s), suitable mathematical formula, and/or algorithms stored within its memory 120 that correlates the received sensor data to the acceleration values of the disc scraper(s) 62. The monitored acceleration values may then be stored within the memory 120 of the controller 116 or transmitted to the user interface 124 (e.g., via the communicative link 122) for display to the operator.

It should be appreciated that the monitored acceleration values may correspond to any suitable parameters associated with the movement or vibration of the disc scraper 62 relative to the corresponding frame member. For example, in one embodiment, the monitored acceleration values may be the amplitude and/or frequency of the vibrations or other movement of the disc scraper 62 relative to the corresponding frame member. However, it should be appreciated that, in alternative embodiments, the monitored acceleration values may correspond to any other suitable parameters.

In accordance with aspects of the present subject matter, the controller 116 may be configured to determine when the one or more of the discs of the implement 10 are plugged based on the corresponding monitored acceleration values. More specifically, as described above, in one embodiment, the disc(s) of the implement 10 (e.g., the disc opener(s) 44) may rotate relative to the soil as the implement 10 is moved across the field, thereby forming a furrow for the deposition of seeds. The relative rotational movement between the disc(s) and the soil may cause soil to become adhered to the disc(s). In this regard, the associated disc scraper 62 may be configured to clean or otherwise remove the adhered soil from the disc(s) to prevent the adhered soil from "plugging" the disc(s). In general, the disc(s) may be plugged when sufficient soil has accumulated such that disc(s) is not able to rotate freely relative to the corresponding frame member (e.g., the corresponding backbone 50). In such instances, the rotational speed(s) of the disc(s) may slow or halt, thereby resulting in poor furrow formation. When the disc(s) is not plugged, the associated disc scraper(s) 62 may vibrate or otherwise move relative to the corresponding frame member such that the acceleration experienced by the scraper(s) 62 is within a predetermined range. However, in certain instances (e.g., when the soil is wet and/or heavy), the amount of soil accumulating on the disc(s) may be too great for the associated disc scraper(s) 62 to remove such that the disc(s) becomes plugged with soil. In such instances, the acceleration of the disc scraper(s) 62 relative to the frame member may slow and/or halt. As such, the controller 116 may be configured to analyze monitored acceleration values to determine when the disc(s) of the implement 10 is plugged.

In several embodiments, the controller 116 may be configured to determine that the disc(s) of the implement 10 is plugged when the monitored acceleration of the disc scraper(s) drops below a predetermined minimum acceleration value(s). Specifically, the controller 116 may be configured to compare the values associated with the monitored acceleration(s) of the disc scraper(s) 62 to one or more predetermined minimum acceleration values. For example, the minimum acceleration value may correspond a non-zero value that is less than (e.g., fifty percent of) the expected minimum acceleration of the disc scraper(s) 62 during non-plugged operation of the disc(s). Alternatively, the minimum acceleration value may correspond zero acceleration of the disc scraper(s) 62. In one embodiment, the controller 116 may be configured to compare the monitored acceleration values to first and second predetermined minimum acceleration values, with the first value being greater than the second value. In such an embodiment, the plugging of the disc(s) may be of a first or lesser severity when the monitored disc scraper acceleration(s) falls below the first minimum acceleration value, and a second or greater severity when the monitored disc scraper acceleration(s) falls below the second minimum acceleration value. For instance, the first value may be a non-zero value that is less than the expected minimum acceleration(s) of the disc scraper 62 during non-plugged operation of the disc(s) and the second value may be zero. Thereafter, when the values of the monitored acceleration fall below the minimum acceleration value(s) (thereby indicating that the disc(s) is not rotating freely), the controller 116 may be configured to determine that the associated disc(s) is plugged.

It should be appreciated that the predetermined minimum acceleration value(s) may vary based on the operation of the implement 10. Specifically, in one embodiment, the predetermined minimum acceleration value(s) may vary based on the ground speed of the implement 10. For instance, the expected minimum acceleration(s) of the disc scraper 62 during non-plugged operation may be higher when the ground speed of the implement 10 is high than when the ground speed of the implement 10 is low. In such an embodiment, the predetermined minimum acceleration value(s) may increase when the ground speed of the implement increases. However, in alternative embodiments, the predetermined minimum acceleration value(s) may be adjusted based on any other suitable operating parameter(s) of the implement 10.

Furthermore, it should be appreciated that the controller 116 may be configured to determine that the disc(s) of the implement 10 is plugged using the monitored acceleration(s) of the disc scraper 62 in any other suitable manner. Specifically, in one embodiment, the controller 116 may be configured to compare the acceleration values associated with a plurality of discs. In such an embodiment, when the monitored acceleration(s) of the disc scraper 62 associated with a first disc differs by more than a predetermined amount from the monitored acceleration(s) of the disc scraper 62 associated with a second disc, the controller 116 may be configured to determine that the first disc is plugged. In another embodiment, the controller 116 may be configured to determine a historical average of the monitored acceleration(s) of the disc scraper 62, such as by calculating the average of the acceleration(s) over a predetermined time period (e.g., the last five minutes of operation). Thereafter, when the monitored acceleration(s) of the disc scraper 62 differs by more than a predetermined amount from the historical average, the controller 116 may be configured to determine that the associated disc is plugged. In addition, the controller 116 may be configured to initiate one or more control actions when it is determined that the disc(s) of the implement 10 is plugged. In general, such control action(s) may be associated with or otherwise intended to prevent further accumulation of soil on the disc(s) of the implement 10 and/or de-plug or otherwise remove soil already accumulated on the disc(s). For example, in one embodiment, when it is determined that one or more discs (e.g., the disc opener(s) 44) of the implement 10 are plugged, the controller 116 may be configured to notify the operator of implement/vehicle 10/12 that the disc(s) is plugged. Specifically, the controller 116 may be configured to transmit instructions to the user interface 124 (e.g., the communicative link 122) instructing the user interface 124 to provide a notification to the operator of the implement/vehicle 10/12 (e.g., by causing a visual or audible notification or indicator to be presented to the operator) indicating that the disc(s) is plugged. In such instances, the operator may then choose to initiate any suitable corrective action he/she believes is necessary, such as adjusting one or more operating parameters of the implement 10 and/or the vehicle 12.

Moreover, in several embodiments, the controller 116 may be configured to automatically adjust one or more operating parameters of the implement 10 and/or the vehicle 12 when it is determined that one or more discs of the implement 10 are plugged. Specifically, in one embodiment, the controller 116 may be configured to initiate adjustment of the down pressure applied to and/or the penetration depth(s) of one or more discs (e.g., the disc opener(s) 44) of the implement 10. For example, the controller 116 may be configured transmit instructions to the rockshaft actuator 102 and/or the row unit actuator(s) 108 (e.g., via the communicative link 112) instructing the actuator(s) 102, 108 to adjust the down pressure applied to and/or the penetration depth(s) of associated disc opener(s) 44.

Furthermore, in one embodiment, the controller 116 may be configured to automatically adjust the ground speed at which the implement/vehicle 10/12 is traveling across the field when it is determined one or more discs of the implement 10 are plugged. Specifically, the controller 116 may be configured to transmit instructions to the engine 26 and/or the transmission 28 (e.g., via the communicative link 122) instructing the engine 26 and/or the transmission 28 to adjust their operation. For example, the controller 116 may instruct the engine 26 to vary its power output and/or the transmission 28 to upshift or downshift to increase or decrease the ground speed of the implement/vehicle 10/12 in a manner that reduces or minimizes further accumulation of soil on the disc(s). However, in alternative embodiments, the controller 116 may be configured to transmit instructions to any other suitable components (e.g., braking actuators) of the vehicle 12 and/or the implement 10 such that the ground speed of the implement/vehicle 10/12 is adjusted. Furthermore, it should be appreciated that any other suitable parameter(s) the implement 10 and/or the vehicle 12 may be adjusted when it is determined one or more discs of the implement 12 are plugged.

Additionally, the controller 116 may be configured to initiate differing control actions based on the severity of the plugging of the disc(s) of the implement 10. As indicated above, in one embodiment, the controller 116 may be configured to compare the monitored acceleration values of the disc(s) to first and second predetermined minimum acceleration values. In such an embodiment, the first minimum acceleration value may be associated with a first or lesser severity of plugging, while the second minimum acceleration value may be associated with a second or greater severity of plugging. In this regard, when the monitored acceleration values of one or more discs of the implement 10 fall below the first minimum acceleration value, the controller 116 may be configured initiate a first control action. Thereafter, when the monitored acceleration values of one or more discs of the implement 10 fall below the second minimum acceleration value, the controller 116 may be configured initiate a second, different control action. In general, the second control action may be configured to more aggressively prevent further soil accumulation on and/or de-plug the disc(s) than the first control action. For example, in one embodiment, the first control action may correspond to adjusting an operating parameter of the implement 10 (e.g., the ground speed and/or the down pressure applied and/or the penetration depths of the disc opener(s) 44), while the second control action comprises halting the operation of the implement 10. However, in alternative embodiments, the first and second control actions may correspond to any other suitable control actions.

Figure 5:
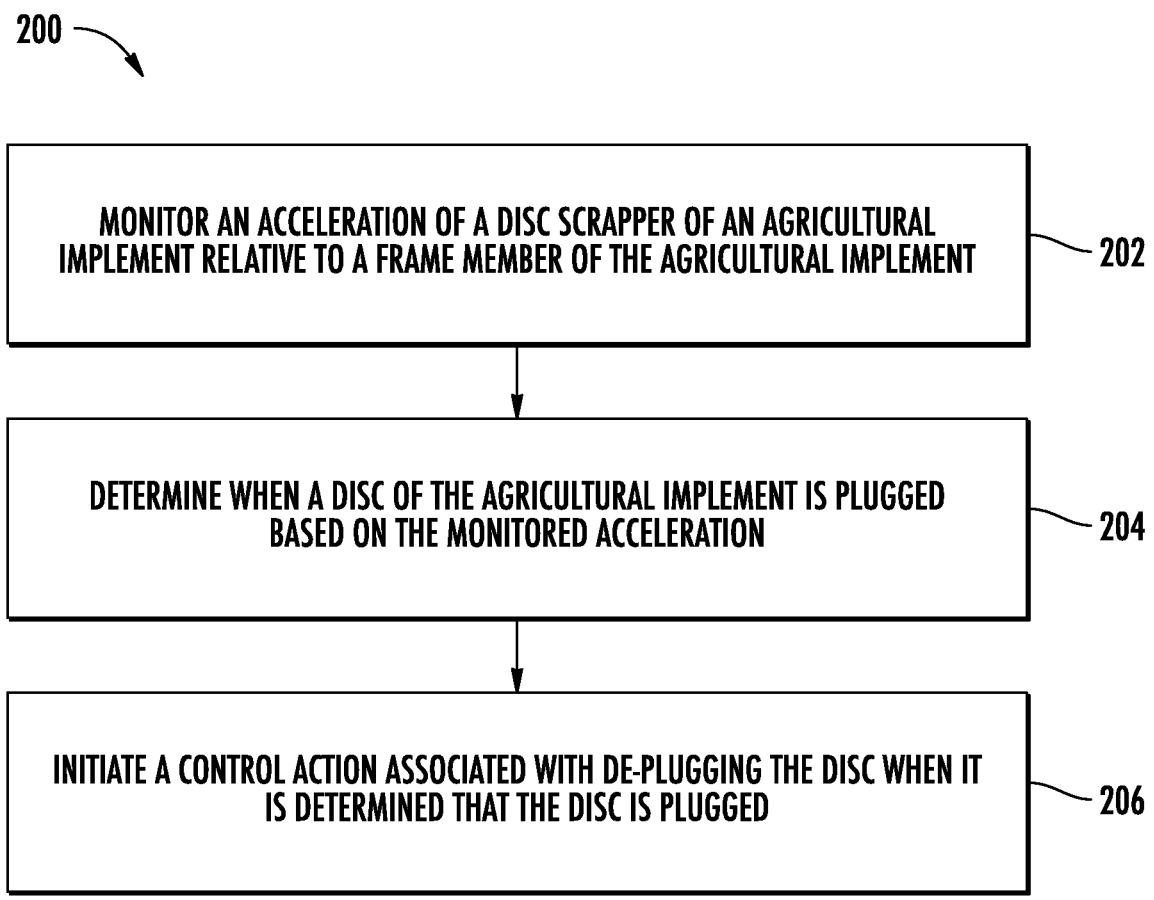
FIG. 5 illustrates a flow diagram of one embodiment of a method for detecting plugging of an agricultural implement in accordance with aspects of the present subject matter Repeat use of reference characters in the present specification and drawings is intended to represent the same or analogous features or elements of the present technology.

Referring now to FIG. 5, a flow diagram of one embodiment of a method 200 for detecting plugging of an agricultural implement is illustrated in accordance with aspects of the present subject matter. In general, the method 200 will be described herein with reference to the agricultural implement 10, the work vehicle 12, and the system 100 described above with reference to FIGS. 1-4. However, it should be appreciated by those of ordinary skill in the art that the disclosed method 200 may generally be implemented with any agricultural implement having any suitable implement configuration, any work vehicle having any suitable vehicle configured, and/or any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include monitoring, with a computing device, an acceleration of a disc scraper of an agricultural implement relative to a frame member of the agricultural implement. For instance, as described above, the controller 116 may be configured to monitor the acceleration of a disc scraper 62 of an agricultural implement 10 relative to a frame member 50 of the implement 10 based on data received from a sensor 114.

Additionally, at (204), the method 200 may include determining, with the computing device, when a disc of the agricultural implement is plugged based on the monitored acceleration. For instance, as described above, the controller 116 may be configured to determine when an opener disc 44 of the implement 10 is plugged based on the monitored acceleration.

Moreover, as shown in FIG. 5, at (206), the method 200 may include initiating, with the computing device, a control action associated with de-plugging the disc when it is determined that the disc is plugged. For instance, as described above, when it is determined that the opener disc 44 is plugged, the controller 116 may be configured to initiate one or more control actions associated with de-plugging the opener disc 44, such as adjusting one or more operating parameters of the implement 10 and/or vehicle 12. Such operating parameters may include the ground speed of the implement/vehicle 10/12 and/or the down pressure applied to and/or the penetration depth(s) of the opener disc 44.

It is to be understood that the steps of the method 200 are performed by the controller 116 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 116 described herein, such as the method 200, is implemented in software code or instructions which are tangibly stored on a tangible computer readable medium. The controller 116 loads the software code or instructions via a direct interface with the computer readable medium or via a wired and/or wireless network. Upon loading and executing such software code or instructions by the controller 116, the controller 116 may perform any of the functionality of the controller 116 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for detecting plugging of an agricultural implement, the system comprising:
   a frame member;
   a disc rotatably coupled to the frame member, the disc configured to rotate relative to soil within a field as the agricultural implement is moved across the field;
   a disc scraper coupled to the frame member, the disc scraper configured to remove the soil from the disc as the disc rotates relative to the soil;
   a sensor configured to detect a parameter indicative of an acceleration of the disc scraper relative to frame member; and
   a controller communicatively coupled to the sensor, the controller configured to monitor the acceleration of the disc scraper relative to the frame member based on data received from the sensor, the controller further configured to determine when the disc is plugged based on the monitored acceleration.

2. The system of claim 1, wherein the controller is further configured to:
   compare the monitored acceleration to a predetermined minimum acceleration value; and
   determine that the disc is plugged when the monitored acceleration falls below the predetermined minimum acceleration value.

3. The system of claim 1, wherein the controller is further configured to determine that the disc is plugged when the monitored acceleration is zero.

4. The system of claim 1, wherein the controller is further configured to initiate a control action associated with de-plugging the disc when it is determined that the disc is plugged.

5. The system of claim 4, wherein the control action comprises notifying an operator of the agricultural implement that the disc is plugged.

6. The system of claim 4, wherein the control action comprises adjusting an operating parameter of the agricultural implement.

7. The system of claim 6, wherein the operating parameter comprises a ground speed of the agricultural implement.

8. The system of claim 6, wherein the operating parameter comprises at least one of a down pressure applied to or a penetration depth of the disc.

9. The system of claim 1, wherein the controller is further configured to:
   initiate a first control action when the monitored acceleration falls below a first predetermined minimum acceleration value; and
   initiate a second control action when the monitored acceleration falls below a second predetermined minimum acceleration value, the second predetermined minimum acceleration value being less than the first predetermined minimum acceleration value.

10. The system of claim 9, wherein the first control action comprises adjusting an operating parameter of the agricultural implement and the second control action comprises halting the operation of the agricultural implement.

11. A method for detecting plugging of an agricultural implement, the agricultural implement including a disc configured to rotate relative to soil within a field as the agricultural implement is moved across the field, the agricultural implement further including a disc scraper configured to remove the soil from the disc as the disc rotates relative to the soil, the method comprising:
   monitoring, with a computing device, an acceleration of the disc scraper relative to a frame member of the agricultural implement;
   determining, with the computing device, when the disc is plugged based on the monitored acceleration; and
   initiating, with the computing device, a control action associated with de-plugging the disc when it is determined that the disc is plugged.

12. The method of claim 11, wherein determining when the disc is plugged comprises:
   comparing, with the computing device, the monitored acceleration to a predetermined minimum acceleration value; and
   determining, with the computing device, that the disc is plugged when the monitored acceleration falls below the predetermined minimum acceleration value.

13. The method of claim 11, wherein determining when the disc is plugged comprises determining, with the computing device, that the disc is plugged when the monitored acceleration is zero.

14. The method of claim 11, wherein the control action comprises notifying an operator of the agricultural implement that the disc is plugged.

15. The method of claim 11, wherein the control action comprises adjusting an operating parameter of the agricultural implement.

16. The method of claim 15, wherein the operating parameter comprises a ground speed of the agricultural implement.

17. The method of claim 15, wherein the operating parameter comprises at least one of a down pressure applied to or a penetration depth of the disc.

18. The method of claim 11, wherein initiating the control action comprises:
   initiating, with the computing device, a first control action when the monitored acceleration falls below a first predetermined minimum acceleration value; and
   initiating, with the computing device, a second control action when the monitored acceleration falls below a second predetermined minimum acceleration value, the second predetermined minimum acceleration value being less than the first predetermined minimum acceleration value.

19. The method of claim 18, wherein the first control action comprises adjusting an operating parameter of the agricultural implement and the second control action comprises halting the operation of the agricultural implement.

* * * * *